(12) United States Patent
Ide (10) Patent No.: US 11,033,979 B2
(45) Date of Patent: Jun. 15, 2021

(54) ARC WELDING CONTROL METHOD (71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 904 days.

(21) Appl. No.: 15/508,632

(22) PCT Filed: Aug. 20, 2015

(86) PCT No.: PCT/JP2015/073441
§ 371 (c)(1),
(2) Date: Mar. 3, 2017

(87) PCT Pub. No.: WO2016/039113
PCT Pub. Date: Mar. 17, 2016

(65) Prior Publication Data
US 2017/0252850 A1 Sep. 7, 2017

(30) Foreign Application Priority Data

Sep. 8, 2014 (JP) .............................. JP2014-181993
Sep. 29, 2014 (JP) .............................. JP2014-197876

(51) Int. Cl.
*B23K 9/00* (2006.01)
*B23K 9/12* (2006.01)
(Continued)

(52) U.S. Cl.
CPC ............... *B23K 9/125* (2013.01); *B23K 9/00* (2013.01); *B23K 9/073* (2013.01); *B23K 9/091* (2013.01);
(Continued)

(58) Field of Classification Search
CPC . B23K 9/00; B23K 9/073; B23K 9/12; B23K 9/124; B23K 2/125; B23K 9/095; B23K 9/173
(Continued)

(56) References Cited

U.S. PATENT DOCUMENTS 4,780,594 A * 10/1988 Rothermel ............. B23K 9/124
219/136
2004/0074884 A1 4/2004 Butler et al.
(Continued)

FOREIGN PATENT DOCUMENTS

JP   2008-105035   5/2008
JP   5201266       2/2013
(Continued)

OTHER PUBLICATIONS

Extended European Search Report, dated Apr. 10, 2018, from the European Patent Office (EPO) for the corresponding European Patent Application No. 15840237.0.
(Continued)

*Primary Examiner* — Mark H Paschall
(74) *Attorney, Agent, or Firm* — Greenblum & Bernstein, P.L.C.

(57) ABSTRACT

There is provided an arc welding control method of performing a forward/reverse feeding control of alternating a feeding rate of a welding wire between a forward feeding period and a reverse feeding period, and generating short-circuiting periods and arc periods to perform welding. The welding wire is fed forwardly at a time of staring the welding. The forward/reverse feeding control is started from the reverse feeding period of the welding wire after starting conduction of a welding current.

3 Claims, 7 Drawing Sheets

(51) Int. Cl.
*B23K 9/073* (2006.01)
*B23K 9/09* (2006.01)
*B23K 9/095* (2006.01)
*B23K 9/173* (2006.01)

(52) U.S. Cl.
CPC ............... *B23K 9/095* (2013.01); *B23K 9/12* (2013.01); *B23K 9/173* (2013.01)

(58) Field of Classification Search
USPC ..... 219/137.2, 137.7, 121.45, 121.46, 76.15, 219/76.16
See application file for complete search history.

(56) References Cited

U.S. PATENT DOCUMENTS

| | | | |
|---|---|---|---|
| 2007/0056942 A1* | 3/2007 | Daniel | B23K 9/1062 219/125.1 |
| 2008/0149606 A1* | 6/2008 | Uezono | B23K 9/0671 219/124.01 |
| 2012/0097654 A1* | 4/2012 | Kawamoto | B23K 9/073 219/125.1 |
| 2012/0111842 A1 | 5/2012 | Fujiwara et al. | |
| 2012/0255940 A1* | 10/2012 | Fujiwara | B23K 9/09 219/137 R |
| 2014/0203003 A1* | 7/2014 | Fujiwara | B23K 9/0735 219/125.1 |
| 2014/0360997 A1* | 12/2014 | Murakami | B23K 9/0953 219/130.51 |
| 2016/0303679 A1 | 10/2016 | Ide | |
| 2017/0001254 A1 | 1/2017 | Ide | |

FOREIGN PATENT DOCUMENTS

| | | |
|---|---|---|
| JP | 2014-140869 | 8/2014 |
| WO | 2012/046411 A1 | 4/2012 |

OTHER PUBLICATIONS

International Search Report in WIPO Application No. PCT/JP2015/073441, dated Nov. 17, 2015, with English language translation.
Written Opinion in WIPO Application No. PCT/JP2015/073441, dated Nov. 17, 2015, with English language translation.
Japan Office Action, dated May 15, 2019, (including English language translation) in the corresponding Japanese Patent Application No. 2016-547802.

* cited by examiner

ARC WELDING CONTROL METHOD

TECHNICAL FIELD

The present invention relates to an arc welding control method of performing a forward/reverse feeding control of alternating a feeding rate of a welding wire between a forward feeding period and a reverse feeding period, and generating short-circuiting periods and arc periods to perform welding.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between forward feeding and reverse feeding cyclically (see Patent Document 1, for example).

According to the invention of the patent document 1, an average value of the feeding rate is adjusted according to a welding current setting value, and a repetition frequency and an amplitude of the forward feeding and the reverse feeding of the welding wire are adjusted to respective values according to the welding current setting value.

PRIOR ART DOCUMENT

Patent Document

Patent Document 1: Japanese Patent No. 5201266 B

SUMMARY OF INVENTION

Problems to Be Solved by Invention

During a transient welding period from start of welding to convergence to a steady welding period, if a forward/reverse feeding control the same as that in the steady welding period is performed, there arises a problem that a welding state becomes unstable.

Accordingly an object of the present invention is to provide an arc welding control method which, in welding of alternating a feeding rate between a forward feeding period and a reverse feeding period, can stabilize a welding state during a transient welding period from start of welding to convergence to a steady welding period.

Means for Solving Problems

In order to solve the above-described problem, according to the present invention, there is provided an arc welding control method of performing a forward/reverse feeding control of alternating a feeding rate of a welding wire between a forward feeding period and a reverse feeding period, and generating short-circuiting periods and arc periods to perform welding, the arc welding control method comprising: feeding the welding wire forwardly at a time of staring the welding; and starting the forward/reverse feeding control from the reverse feeding period of the welding wire after starting conduction of a welding current.

According to the present invention, the arc welding control method further comprising: during a transient welding period until convergence to a steady welding period, shifting the feeding rate to the forward feeding period responding to start of the arc period in the reverse feeding period, and shifting the feeding rate to the reverse feeding period responding to start of the short-circuiting period in the forward feeding period.

According to the present invention, in the arc welding control method, the transient welding period is defined as a period from the start of conduction of the welding current to termination of the forward feeding period or the reverse feeding period after elapsing a predetermined period.

According to the present invention, in the arc welding control method, the transient welding period is defined as a period from the start of conduction of the welding current to termination of a predetermined number of the forward feeding periods or a predetermined number of the reverse feeding periods.

According to the present invention, the arc welding control method further comprising: setting a waveform parameter of the feeding rate during the transient welding period to a value different from that during the steady welding period.

According to the present invention, the arc welding control method further comprising: setting an average value of the feeding rate during the transient welding period to a value different from that during the steady welding period.

According to the present invention, the arc welding control method further comprising: setting an amplitude of the feeding rate during the transient welding period to a value different from that during the steady welding period.

According to the present invention, the arc welding control method further comprising: setting a forward feeding amplitude of the feeding rate during the transient welding period to a value smaller than that during the steady welding period.

According to the present invention, in the arc welding control method, a push-side feeding motor for performing a forward feeding control is provided in addition to a pull-side feeding motor for performing the forward/reverse feeding control, and the push-side feeding motor accelerates with an inclination after starting the conduction of welding current.

Advantageous Effects of Invention

According to the present invention, in the welding of alternating the feeding rate between the forward feeding period and the reverse feeding period, the forward/reverse feeding control, which is different from the control during the steady welding period, is performed during the transient welding period from the start of welding to the convergence to the steady welding period. Thus the welding state during the transient welding period can be stabilized.

BRIEF DESCRIPTION OF DRAWINGS

FIG. 3 A timing chart illustrating individual signals during a steady welding period in the welding power supply of FIG.

1, showing the arc welding control method according to the first embodiment of the present invention.

EMBODIMENTS OF INVENTION

Hereinafter embodiments according to the present invention will be explained with reference to drawings.

First Embodiment

Figure 1:
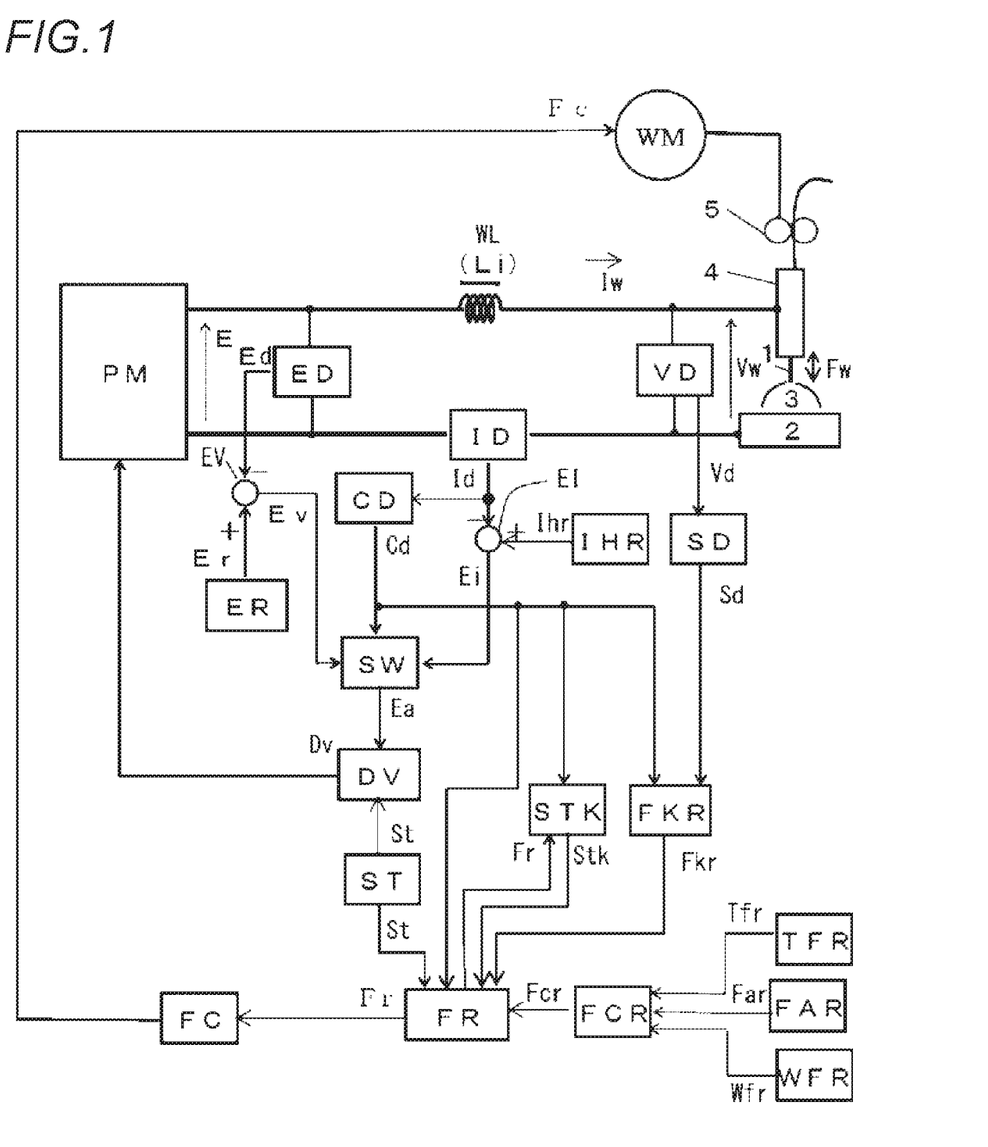
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to a drive signal Dv described later, and outputs an output voltage E. Although not shown in the figure, this power supply main circuit PM includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smooths the output voltage E. An inductance value of the reactor WL is, for example, 200 µH.

Using a feed control signal Fc described later as input, a feeding motor WM feeds a welding wire 1 at a feeding rate Fw in a manner of alternating forward feeding and reverse feeding cyclically. A motor having high transient responsiveness is used as the feeding motor WM. In some cases, the feeding motor WM is installed near a tip of a welding torch 4 in order to increase a changing rate of the feeding rate Fw and an inversion speed of the feeding direction of the welding wire 1. Further in some cases, a push-pull feeding system is employed by using two feeding motors WM.

The welding wire 1 is fed within the welding torch 4 in accordance with rotation of a feeding roll 5 coupled to the feeding motor WM, and thus an arc 3 is generated between the welding wire and base material 2. A welding voltage Vw is applied between a power supply tip (not shown) within the welding torch 4 and the base material 2, and thus a welding current Iw flows.

An output voltage setting circuit ER outputs an output voltage setting signal Er set in advance. An output voltage detection circuit ED detects and smooths the output voltage E, thereby outputting an output voltage detection signal Ed.

Using the output voltage setting signal Er and the output voltage detection signal Ed as input, a voltage error amplifier circuit EV amplifies an error between the output voltage setting signal Er (+) and the output voltage detection signal Ed (−) and outputs a voltage error amplified signal Ev. This circuit controls the welding power supply to a constant voltage.

A hot-start current setting circuit IHR outputs a predetermined hot-start current setting signal Ihr. A current detection circuit ID detects the welding current Iw and outputs a current detection signal Id.

Using the hot-start current setting signal Ihr and the current detection signal Id as input, a current error amplifier circuit EI amplifies an error between the hot-start current setting signal Ihr (+) and the current detection signal Id (−) and outputs a current error amplified signal Ei. This circuit controls the welding power supply to a constant current during a period (hot-start period) in which the hot-start current flows.

Using the current detection signal Id as input, a current-conduction discrimination circuit CD discriminates that the welding current Iw flows when a value of the current detection signal is a threshold value (about 10V) or more and outputs a current-conduction discrimination signal Cd.

Using the current error amplified signal Ei, the voltage error amplified signal Ev and the current-conduction discrimination signal Cd as input, a power-supply characteristic switching circuit SW outputs the current error amplified signal Ei as an error amplified signal Ea during the predetermined hot-start period from a time where the current-conduction discrimination signal Cd changes to a high level (current conduction), whilst outputs the voltage error amplified signal Ev as the error amplified signal Ea during the other period.

A voltage detection circuit VD detects the welding voltage Vw and outputs a voltage detection signal Vd. Using the voltage detection signal Vd as input, a short-circuit discrimination circuit SD outputs a short-circuit discrimination signal Sd. In a case where a value of the voltage detection signal is less than a short-circuit discrimination value (about 10V), the discrimination circuit determines to be a short-circuiting period and outputs the discrimination signal of a high level. In a case where a value of the voltage detection signal is the short-circuit discrimination value or more, the discrimination circuit determines to be an arc period and outputs the discrimination signal of a low level.

A welding start circuit ST outputs a welding start signal St which becomes a high level when the welding power supply is activated. This welding start circuit ST corresponds to a start switch of the welding torch 4, a PLC for controlling a welding process, a robot control device or the like.

Using the voltage error amplified signal Ea and the welding start signal St as input, a driving circuit DV performs a PWM modulation control based on the error amplified signal Ea when the welding start signal St is at the high level (welding start), and outputs the drive signal Dv for driving the inverter circuit within the power supply main circuit PM.

Using the current-conduction discrimination signal Cd and a feeding-rate setting signal Fr described later as input, a transient welding-period timer circuit STK selectively performs one of the following processing 1) to 4) and outputs a transient welding-period timer signal Stk. 1) Outputting the transient welding-period timer signal Stk which is set to a high level at a time where the current-conduction discrimination signal Cd changes to the high level (current conduction), and reset to a low level at a time where a forward feeding period or a reverse feeding period of the feeding-rate setting signal Fr terminates after elapsing a predetermined period from the setting. 2) Outputting the transient welding-period timer signal Stk which is set to the high level at the time where the current-conduction discrimination signal Cd changes to the high level (current conduction), and reset to the low level at a time where a predetermined number of the forward feeding periods or a predetermined number of the reverse feeding periods of the feeding-rate setting signal Fr terminates after the setting. 3) Outputting the transient welding-period timer signal Stk which is set to the high level at the time where the current-conduction discrimination signal Cd changes to the high level (current conduction), and reset to the low level at a time where the forward feeding period of the feeding-rate setting signal Fr terminates after elapsing the predetermined period from the setting. 4) Outputting the transient welding-period timer signal Stk which is set to the high level at the time where the current-conduction discrimination signal Cd changes to the high level (current conduction), and reset to the low level at a time where the predetermined number of the forward feeding periods of the feeding-rate setting signal Fr terminates after the setting.

An average feeding-rate setting circuit FAR outputs a predetermined average feeding-rate setting signal Far. A cycle setting circuit TFR outputs a predetermined cycle setting signal Tfr. An amplitude setting circuit WFR outputs a predetermined amplitude setting signal Wfr.

Using the average feeding-rate setting signal Far, the cycle setting signal Tfr and the amplitude setting signal Wfr as input, a steady welding-period feeding-rate setting circuit FCR outputs a steady welding-period feeding-rate setting signal Fcr. The steady welding-period feeding-rate setting signal is configured by shifting a predetermined trapezoidal wave, that has a cycle Tf determined by the cycle setting signal Tfr and an amplitude Wf determined by the amplitude setting signal Wfr and changes symmetrically in positive and negative sides, to a forward-feeding side by an amount of the average feeding-rate setting signal Far. This steady welding-period feeding-rate setting signal Fcr will be described in detail with reference to (B) of FIG. 3.

Using the current-conduction discrimination signal Cd and the short-circuit discrimination signal Sd as input, a transient welding-period feeding-rate setting circuit FKR performs a processing described in detail with reference to (B) of FIG. 2 and outputs a transient welding-period feeding-rate setting signal Fkr.

Using the steady welding-period feeding-rate setting signal Fcr, the transient welding-period feeding-rate setting signal Fkr, the welding start signal St, the current-conduction discrimination signal Cd and the transient welding-period timer signal Stk as input, a feeding-rate setting circuit FR performs the following processing and outputs a feeding-rate setting signal Fr. 1) When the welding start signal St becomes the high level (welding start), outputting the feeding-rate setting signal Fr switched from 0 to a predetermined slow-down feeding rate. Feeding of the welding wire 1 is stopped in a case of Fr=0. 2) When the current-conduction discrimination signal Cd becomes the high level (current conduction), outputting the transient welding-period feeding-rate setting signal Fkr as the feeding-rate setting signal Fr. 3) When the transient welding-period timer signal Stk becomes the low level, outputting the steady welding-period feeding-rate setting signal Fcr as the feeding-rate setting signal Fr.

Using the feeding-rate setting signal Fr as input, a feeding control circuit FC outputs, to the feeding motor WM, the feeding control signal Fc for feeding the welding wire 1 at the feeding rate Fw corresponding to a value of the feeding-rate setting signal Fr.

Figure 2:
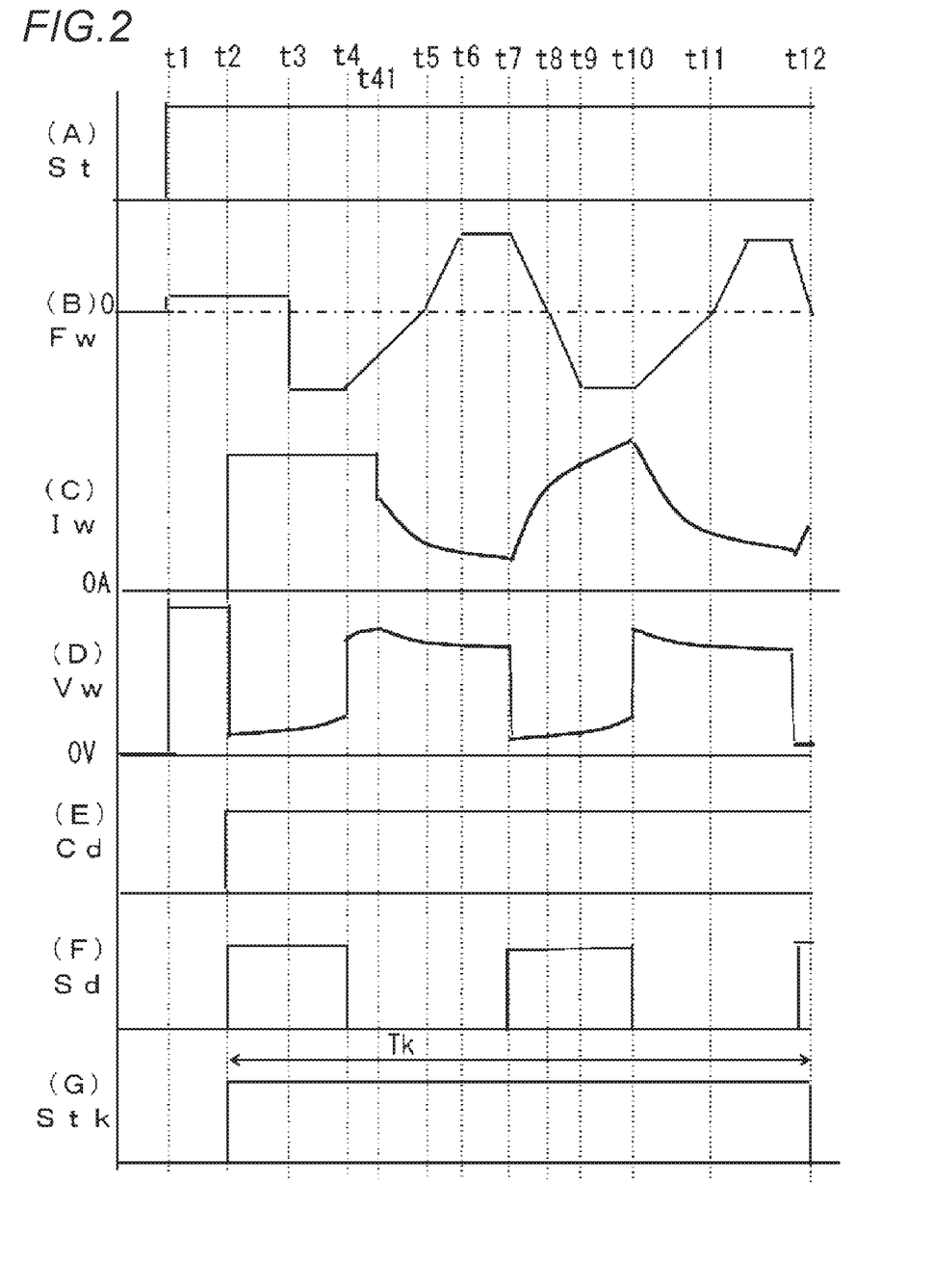
FIG. 2 A timing chart illustrating individual signals at a time of starting welding in the welding power supply of FIG. 1, showing the arc welding control method according to the first embodiment of the present invention.

FIG. 2 is a timing chart illustrating individual signals at the time of starting the welding in the welding power supply of FIG. 1, showing the arc welding control method according to the first embodiment of the present invention. (A) of this figure shows temporal change of the welding start signal St, (B) of this figure shows temporal change of the feeding rate Fw, (C) of this figure shows temporal change of the welding current 1w, (D) of this figure shows temporal change of the welding voltage Vw, (E) of this figure shows temporal change of the current-conduction discrimination signal Cd, (F) of this figure shows temporal change of the short-circuit discrimination signal Sd, and (G) of this figure shows temporal change of the transient welding-period timer signal Stk. Hereinafter operations of the individual signals at the time of starting the welding will be explained with reference to this figure.

As shown in (B) of this figure, in the feeding rate Fw, an upper side and a lower side than 0 represent the forward feeding period and the reverse feeding period, respectively. The forward feeding represents feeding of the welding wire 1 in a direction approaching the base material 2, whilst the reverse feeding represents feeding of the welding wire in a direction separating from the base material 2. The feeding rate Fw has a waveform which changes in a trapezoidal shape and shifts on the forward feeding side. Thus, as an average value of the feeding rate Fw is positive, the welding wire 1 is fed forwardly in average.

When viewing the trapezoidal wave of the feeding rate Fw with respect to 0 as a reference line, as shown in (B) of this figure, a reverse feeding period of the transient welding period is formed by a predetermined reverse-feeding acceleration period of the transient welding period, a reverse-feeding peak period of the transient welding period terminating at a time of regeneration of an arc, a predetermined reverse-feeding peak value of the transient welding period and a predetermined reverse-feeding deceleration period of the transient welding period. A forward-feeding period of the transient welding period is formed by a predetermined forward-feeding acceleration period of the transient welding period, a forward-feeding peak period of the transient welding period terminating at a time of occurrence of short circuit, a predetermined forward-feeding peak value of the transient welding period and a predetermined forward-feeding deceleration period of the transient welding period.

When the welding start signal St changes to the high level (welding start) at a time t1, as shown in (B) of this figure, the feeding rate Fw changes from 0 to the predetermined slow-down feeding rate of a positive value, and thus the welding wire 1 is fed forwardly. This slow-down feeding rate is set to a small value of about 1 m/min. Simultaneously as the welding power supply is activated at the time t1, as shown in (D) of this figure, the welding voltage Vw becomes a no-load voltage value of the maximum output voltage value.

When the welding wire 1 is made in contact (short-circuited) with the base material 2 according to the forward feeding at a time t2, as shown in (D) of this figure, the welding voltage Vw rapidly reduces to a short-circuit voltage value of several volts. As the welding voltage Vw reduces to a value less than a predetermined short-circuit discrimination value (about 10V), as shown in (F) of this figure, the short-circuit discrimination signal Sd changes to the high level (short circuit). Simultaneously, at the time t2, as shown in (C) of this figure, the welding current Iw of a predetermined hot-start current value (about 200 to 500 A) starts flowing. Further, as shown in (E) of this figure, the current-conduction discrimination signal Cd changes to the high level (current conduction). In response to this change, as shown in (G) of this figure, the transient welding-period timer signal Stk changes to the high level, and returns to the low level at a time t12 as described later. A period from the time t2 to the time t12 corresponds to a transient welding period Tk. The hot-start current flows during a predetermined hot-start period from the time t2 to a time t41.

[Operation During First Transient Welding-Period Reverse-Feeding Period from Time t3 to Time t5]

At a time t3 upon lapse of a predetermined delay period from the change of the current-conduction discrimination signal Cd to the high level at the time t2, as shown in (B) of this figure, the feeding rate Fw is changed from the forward feeding to the reverse feeding and rapidly accelerated to the predetermined transient welding-period reverse-feeding peak value, thereby entering into the transient welding-period reverse-feeding peak period. The delay period is set to about 1 to 10 ms. The delay period may be set to 0 so as not to be delayed. This delay is provided in order to smoothly generate an initial arc when the welding wire 1 is made in contact with the base material 2.

When an arc 3 is generated at a time t4 due to the conduction of the hot-start current, as shown in (D) of this figure, the welding voltage Vw rapidly increases to an arc voltage value of several tens of volts. In response to this increase, as shown in (F) of this figure, the short-circuit discrimination signal Sd changes to the low level (arc). When the short-circuit discrimination signal Sd changes to the low level (arc) during the transient welding-period reverse-feeding peak period, as shown in (B) of this figure, the feeding rate enters into the transient welding-period reverse-feeding deceleration period from the time t4 to a time t5 and decelerates to 0 from the transient welding-period reverse-feeding peak value. At the time t4 where the feeding rate is in the transient welding period reverse feeding peak period, if the arc 3 is already generated and the short-circuit discrimination signal Sd is at the low level (arc), the feeding rate enters into the transient welding-period reverse-feeding deceleration period from the time t4. At the time t41 during the transient welding-period reverse-feeding deceleration period, as shown in (C) of this figure, the welding current Iw reduces from the hot-start current value to an arc current value which changes according to an arc load. As described above, as the hot-start period from the time t2 to the time t41 is a predetermined value, it is uncertain at which period the feeding rate Fw exists upon the termination of the hot-start period. A period from the time t4 to a time t7 corresponds to the arc period.

[Operation During First Transient Welding-Period Forward-Feeding Period from Time t5 to Time t8]

When the transient welding-period reverse-feeding deceleration period terminates at the time t5, as shown in (B) of this figure, the feeding rate Fw enters into the transient welding-period forward-feeding acceleration period from the time t5 to a time t6 and accelerates from 0 to the transient welding-period forward-feeding peak value.

When the transient welding-period forward-feeding acceleration period terminates at the time t6, as shown in (B) of this figure, the feeding rate Fw enters into the transient welding-period forward-feeding peak period and reaches the transient welding-period forward-feeding peak value.

When short circuit occurs at the time t7 according to the forward feeding, as shown in (D) of this figure, the welding voltage Vw rapidly reduces to the short-circuit voltage value of several volts. In response to this reduction, as shown in (F) of this figure, the short-circuit discrimination signal Sd changes to the high level (short circuit). As shown in (D) of this figure, the welding current Iw gradually increases during the short-circuiting period. When the short-circuit discrimination signal Sd changes to the high level (short circuit) during the transient welding-period forward-feeding peak period, as shown in (B) of this figure, the feeding rate enters into the transient welding-period forward-feeding deceleration period from the time t7 to a time t8 and decelerates to 0 from the transient welding-period forward-feeding peak value. A period from the time t7 to a time t10 corresponds to the short-circuiting period.

[Operation During Second Transient Welding-Period Reverse-Feeding Period from Time t8 to Time t11]

When the transient welding-period forward-feeding deceleration period terminates at the time t8, as shown in (B) of this figure, the feeding rate Fw enters into the transient welding-period reverse-feeding acceleration period from the time t8 to a time t9 and accelerates from 0 to the transient welding-period reverse-feeding peak value.

When the transient welding-period reverse-feeding acceleration period terminates at the time t9, as shown in (B) of this figure, the feeding rate Fw enters into the transient welding-period reverse-feeding peak period and reaches the transient welding-period reverse-feeding peak value.

When an arc 3 is generated at the time t10 due to the reverse feeding and a pinch force caused by the conduction of the welding current Iw, as shown in (D) of this figure, the welding voltage Vw rapidly increases to the arc voltage value of several tens of volts. In response to this increase, as shown in (F) of this figure, the short-circuit discrimination signal Sd changes to the low level (arc). As shown in (C) of this figure, the welding current Iw gradually reduces during the arc period. When the short-circuit discrimination signal Sd changes to the low level (arc) during the transient welding-period reverse-feeding peak period, as shown in (B) of this figure, the feeding rate enters into the transient welding-period reverse-feeding deceleration period from the time t10 to a time t11 and decelerates to 0 from the transient welding-period reverse-feeding peak value.

A period from the time t11 to the time t12 corresponds to a second transient-welding period forward-feeding period. An operation during this period is the same as that during the period from the time t5 to the time t8, with explanation thereof being omitted. As shown in (G) of this figure, after elapsing the predetermined period from the change of the current-conduction discrimination signal Cd to the high level (current conduction) at the time t2, the transient welding-period timer signal Stk changes to the low level (steady welding period) in synchronism with the termination timing of the transient welding-period forward-feeding period or the transient welding-period reverse-feeding period. In this figure, the transient welding-period timer signal Stk changes to the low level at the time t12 where the transient welding-period forward-feeding period terminates. Thus the period from the time t2 to the time t12 corresponds to the transient welding period Tk and a period on and after the time t12 corresponds to the steady welding period. In this respect, the transient welding period Tk may be set to a period from the start of conduction of the welding current to termination of a predetermined number of the transient welding-period forward-feeding periods or a predetermined number of the transient welding-period reverse-feeding periods.

Further the transient welding period Tk may be set to a period from the start of conduction of the welding current to termination of the transient welding-period forward-feeding period after elapsing the predetermined period from the start. Furthermore the transient welding period Tk may be set to a period from the start of conduction of the welding current to termination of the predetermined number of the transient welding-period forward-feeding periods. Consequently as the steady welding period always starts from the steady welding-period reverse-feeding period, shifting to the welding state in the steady welding period can be performed more smoothly than a case of starting from the steady welding-period forward-feeding period.

The transient welding period Tk is set as a period until a molten pool having almost the same size as that in the steady welding period is formed. The transient welding period Tk is in a range almost from 50 to 1,000 ms. In this figure, although a waveform of two cycles is drawn within the transient welding period Tk, a waveform of 5 to 100 cycles is actually contained in this period.

Figure 3:
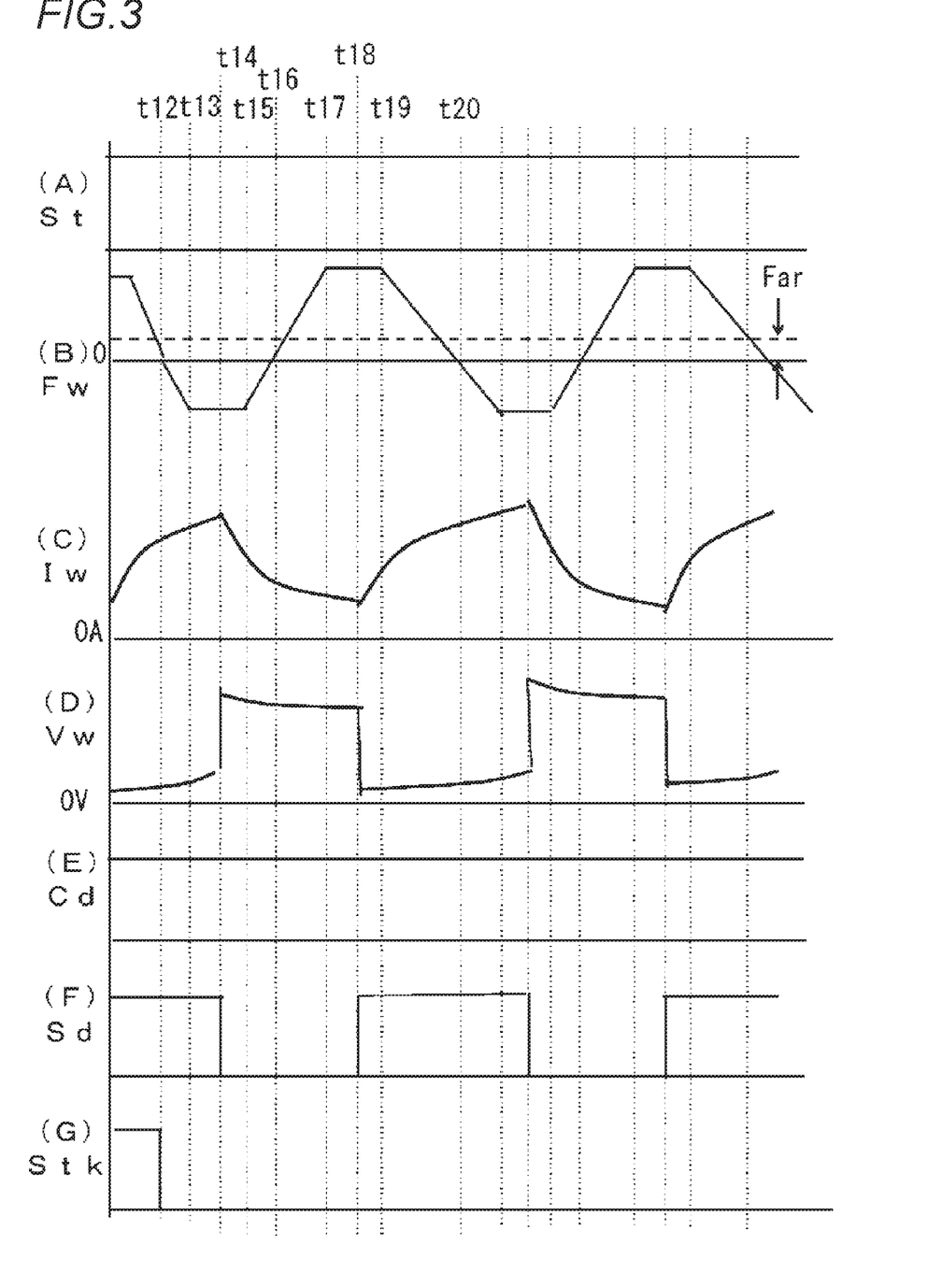

FIG. 3 is a timing chart illustrating individual signals during the steady welding period in the welding power supply of FIG. 1, showing the arc welding control method according to the first embodiment of the present invention. This figure shows an operation during the steady welding period on and after the time t12 at which the transient welding period Tk of FIG. 2 terminates. (A) of this figure shows temporal change of the welding start signal St, (B) of this figure shows temporal change of the feeding rate Fw, (C) of this figure shows temporal change of the welding current Iw, (D) of this figure shows temporal change of the welding voltage Vw, (E) of this figure shows temporal change of the current-conduction discrimination signal Cd, (F) of this figure shows temporal change of the short-circuit discrimination signal Sd, and (G) of this figure shows temporal change of the transient welding-period timer signal Stk. Hereinafter the operation during the steady welding period will be explained with reference to this figure.

The feeding rate Fw shown in (B) of this figure is controlled to a value of the feeding-rate setting signal Fr outputted from the feeding-rate setting circuit FR of FIG. 1. The feeding-rate setting signal Fr is configured by shifting a predetermined trapezoidal wave, that has a cycle Tf determined by the cycle setting signal Tfr and an amplitude Wf determined by the amplitude setting signal Wfr and changes symmetrically in positive and negative sides, to the forward-feeding side by a value of the average feeding-rate setting signal Far. Thus as shown in (B) of this figure, the feeding rate Fw has a feeding rate pattern of the predetermined trapezoidal wave that has the amplitude Wf and the cycle Tf and is symmetrical with respect to an average feeding rate Fa shown by a broken line as a reference line determined by the average feeding-rate setting signal Far. That is, the amplitudes on the upper and lower sides with respect to the reference line are the same. Also the periods on the upper and lower sides with respect to the reference line are the same.

When viewing the trapezoidal wave of the feeding rate Fw with respect to 0 as a reference line, as shown in (B) of this figure, a reverse-feeding period of the steady welding period from the time t12 to a time t16 is formed by a predetermined reverse-feeding acceleration period of the steady welding period, a predetermined reverse-feeding peak period of the steady welding period, a predetermined reverse-feeding peak value of the steady welding period and a predetermined reverse-feeding deceleration period of the steady welding period. A forward-feeding period of the steady welding period from the time t16 to a time t20 is formed by a predetermined forward-feeding acceleration period of the steady welding period, a predetermined forward-feeding peak period of the steady welding period, a predetermined forward-feeding peak value of the steady welding period and a predetermined forward-feeding deceleration period of the steady welding period.

As shown in (G) of this figure, when the transient welding-period timer signal Stk changes to the low level at the time t12, the feeding rate shifts to the steady welding period. During the steady welding period, the welding start signal St is maintained to the high level (welding start) as shown in (A) of this figure, whilst the current-conduction discrimination signal Cd is also maintained to the high level (current conduction) as shown in (E) of this figure.

[Operation During First Steady Welding-Period Reverse-Feeding Period from Time t12 to Time t16]

As shown in (B) of this figure, the feeding rate Fw enters into the steady welding-period reverse-feeding acceleration period from the time t12 to a time t13 and accelerates from 0 to the steady welding-period reverse-feeding peak value. During this period, as a short circuit state occurred during the transient welding-period forward-feeding period from the time t11 to the time t12 continues, the short-circuit discrimination signal Sd is at the high level (short circuit) as shown in (F) of this figure.

When the steady welding-period reverse-feeding acceleration period terminates at the time t13, as shown in (B) of this figure, the feeding rate Fw enters into the steady welding-period reverse-feeding peak period from the time t13 to a time t15 and reaches the steady welding-period reverse-feeding peak value. At a time t14 during this period, an arc 3 is generated again due to the reverse feeding and a pinch force caused by the conduction of the welding current Iw. In response to the arc regeneration, the welding voltage Vw rapidly increases to the arc voltage value of several tens of volts as shown in (D) of this figure, whilst the short-circuit discrimination signal Sd changes to the low level (arc) as shown in (F) of this figure. As shown in (C) of this figure, the welding current Iw gradually reduces from the arc regeneration. In the transient welding period Tk, the reverse-feeding peak period terminates in response to the arc regeneration as a trigger. In contrast, in the steady welding period, the reverse-feeding peak period terminates upon lapse of a predetermined period regardless of the arc regeneration.

When the steady welding-period reverse-feeding peak period terminates at the time t15, as shown in (B) of this figure, the feeding rate enters into the steady welding-period reverse-feeding deceleration period from the time t15 to the time t16 and reduces to 0 from the steady welding-period reverse-feeding peak value.

[Operation During First Steady Welding-Period Forward-Feeding Period from Time t16 to Time t20]

As shown in (B) of this figure, the feeding rate Fw enters into the steady welding-period forward-feeding acceleration period from the time t16 to a time t17 and accelerates from 0 to the steady welding-period forward-feeding peak value. The short circuit state is maintained during this period.

When the steady welding-period forward-feeding acceleration period terminates at the time t17, as shown in (B) of this figure, the feeding rate Fw enters into the steady welding-period forward-feeding peak period from the time t17 to a time t19 and reaches the steady welding-period forward-feeding peak value. At a time t18 during this period, short circuit occurs due to the forward feeding. In response to the short circuit, the welding voltage Vw rapidly reduces to the short circuit voltage value of several volts as shown in (D) of this figure, whilst the short-circuit discrimination signal Sd changes to the high level (short circuit) as shown in (F) of this figure. As shown in (C) of this figure, the welding current Iw gradually increases from the occurrence of short circuit. In the transient welding period Tk, the forward-feeding peak period terminates in response to the occurrence of short circuit as a trigger. In contrast, in the steady welding period, the forward-feeding peak period terminates upon lapse of a predetermined period regardless of the occurrence of short circuit.

When the steady welding-period forward-feeding peak period terminates at the time t19, as shown in (B) of this figure, the feeding rate enters into the steady welding-period forward-feeding deceleration period from the time t19 to the time t20 and reduces to 0 from the steady welding-period forward-feeding peak value.

During the steady welding period after the forward-feeding deceleration period, the operations of the steady welding-period reverse-feeding period and the steady welding-period forward-feeding period are alternatively repeated.

An example of numerical values of the trapezoidal wave of the feeding rate Fw during the steady welding period and the transient welding period will be shown. (Example of Numerical Values of Trapezoidal Wave during Steady Welding Period) When a trapezoidal wave is set to have a cycle Tf of 10 ms, an amplitude Wf of 60 m/min, each half-cycle inclination period of 1.2 ms, a peak period of 2.6 ms and a peak value of 30 m/min, the feeding rate is configured to have a waveform obtained by shifting this trapezoidal wave to the forward-feeding side by the average feeding rate Fa of 5 m/min. An average welding current is about 250 A. Waveform parameters in this case are as follows. The steady welding-period reverse-feeding period is 4.6 ms, the steady welding-period reverse-feeding acceleration period is 1.0 ms, the steady welding-period reverse-feeding peak period is 2.6 ms, the steady welding-period reverse-feeding peak value is −25 m/min, the steady welding-period reverse-feeding deceleration period is 1.0 ms, the steady welding-period forward-feeding period is 5.4 ms, the steady welding-period forward-feeding acceleration period is 1.4 ms, the steady welding-period forward-feeding peak period is 2.6 ms, the steady welding-period forward-feeding peak value is 35 m/min, and the steady welding-period forward-feeding deceleration period is 1.4 ms.
(Example of Numerical Values of Trapezoidal Wave during Transient Welding Period) The transient welding-period reverse-feeding acceleration period is 1.0 ms, the transient welding-period reverse-feeding peak value is −17.5 m/min, the transient welding-period reverse-feeding deceleration period is 1.0 ms, the transient welding-period forward-feeding acceleration period is 1.4 ms, the transient welding-period forward-feeding peak value is 24.5 m/min, and the transient welding-period forward-feeding deceleration period is 1.4 ms.

Although the explanation is made as to the case where the feeding rate F has the trapezoidal wave, the feeding rate is merely required to have a wave such as a sine wave or a triangular wave that changes cyclically.

In the first embodiment, the welding wire is fed forwardly at the time of starting the welding. Then, after the welding wire is made in contact with the base material and the welding current starts flowing, the forward/reverse feeding control is started from the reverse feeding period of the welding wire. This is because the initial arc can be generated more smoothly in the case of starting the forward/reverse feeding control from the reverse feeding period, as compared with the case of starting the forward/reverse feeding control from the forward feeding period.

According to the first embodiment, during the transient welding period until the convergence to the steady welding period, the feeding rate is shifted to the forward feeding period responding to start of the arc period during the reverse feeding period, whilst the feeding rate is shifted to the reverse feeding period responding to start of the short-circuiting period during the forward feeding period. During the steady welding period, the predetermined forward feeding period and the predetermined reverse feeding period are alternately repeated. During the transient welding period where a molten pool is not formed sufficiently, if the predetermined forward feeding period and the predetermined reverse feeding period are alternately repeated like the steady welding period, the welding state becomes unstable. During the transient welding period, the feeding rate shifts to the forward feeding period in response to the arc regeneration as a trigger in the reverse feeding period, whilst the feeding rate shifts to the reverse feeding period in response to the occurrence of short circuit as a trigger. Thus the welding state can be stabilized.

In the first embodiment, the waveform parameter of the feeding rate during the transient welding period is set to a different value from that during the steady welding period. The waveform parameter is the reverse-feeding acceleration period, the reverse-feeding peak value (reverse-feeding amplitude), the reverse-feeding deceleration period, the forward-feeding acceleration period, the forward-feeding peak value (forward-feeding amplitude) or the forward-feeding deceleration period. During the transient welding period, at least one of these waveform parameters is set to a different value from that during the steady welding period. Consequently the welding state during the transient welding period can be stabilized. In this case, it is desirable to set the waveform parameter so that an average value of the feeding rate during the transient welding period is smaller than an average value of the feeding rate during the steady welding period. Accordingly the welding state during the transient period can be further stabilized. During the transient welding period, the amplitude is a sum of the transient welding-period forward-feeding peak value and (an absolute value of) the transient welding-period reverse-feeding peak value. During the steady welding period, the amplitude is a sum of the steady welding-period forward-feeding peak value and (an absolute value of) the steady welding-period reverse-feeding peak value. The amplitude during the transient welding period is desirably set to a value smaller than that during the steady welding period. As a result, the welding state during the transient welding period can be further stabilized. Further the forward feeding amplitude (forward-feeding peak value) during the transient welding period is desirably set to a value smaller than that during the steady welding period. As a result, the welding state during the transient welding period can be further stabilized.

Second Embodiment

According to the invention of a second embodiment, a push-side feeding motor for performing a forward feeding control is provided in addition to the pull-side feeding motor for performing the forward/reverse feeding control according to the first embodiment. The push-side feeding motor accelerates with an inclination during a predetermined acceleration period from start of conduction of the welding current.

Figure 4:
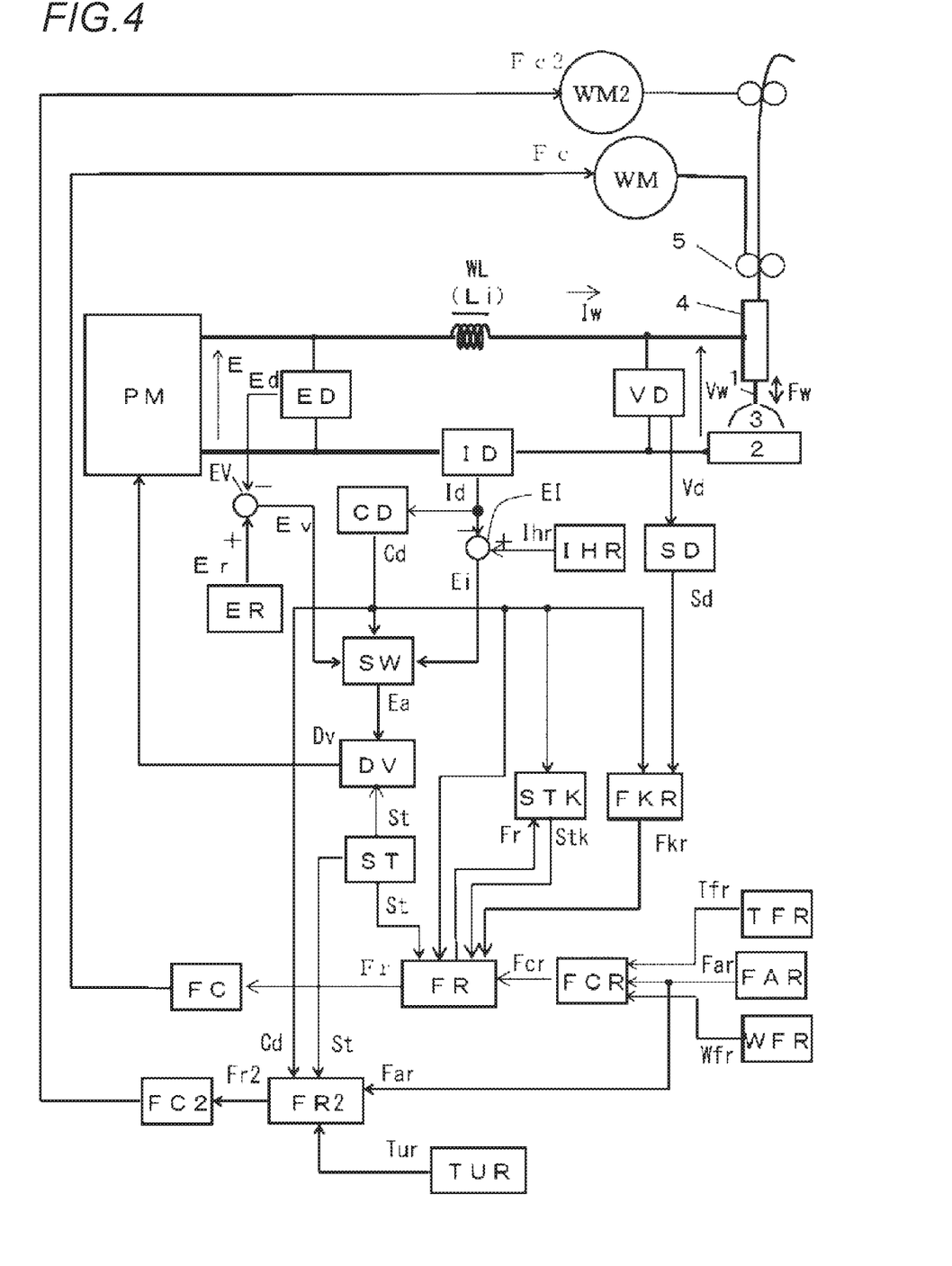
FIG. 4 A block diagram illustrating a welding power supply for implementing an arc welding control method according to a second embodiment of the present invention.

FIG. 4 is a block diagram illustrating a welding power supply for implementing an arc welding control method according to the second embodiment of the present invention. This figure corresponds to FIG. 1, and blocks identical to those of FIG. 1 are referred to by the same symbols, with explanation thereof being omitted. In this figure, a push-side feeding motor WM2, an acceleration-period setting circuit TUR, a second feeding-rate setting circuit FR2 and a second feeding control circuit FC2 are added to FIG. 1. Hereinafter these individual blocks will be explained with reference to this figure.

The feeding motor WM acts as the pull-side feeding motor disposed on the downstream side of the feeding system. A forward/reverse feeding control with respect to the feeding motor WM is the same as that of the first embodiment. The push-side feeding motor WM2 is newly disposed on the upstream side of the feeding system. The push-side feeding motor WM2 is subjected to the forward feeding control according to a second feeding control signal Fc2 described later.

The acceleration-period setting circuit TUR outputs a predetermined acceleration-period setting signal Tur. Using the acceleration-period setting signal Tur, the average feeding-rate setting signal Far, the welding start signal St and the current-conduction discrimination signal Cd as input, the second feeding-rate setting circuit FR2 performs the following processing and outputs a second feeding-rate setting signal Fr2. 1) When the welding start signal St becomes the high level (welding start), outputting the second feeding-rate setting signal Fr2 switched from 0 to a predetermined second slow-down feeding rate. Feeding of the welding wire 1 is stopped in a case of Fr2=0. 2) During an acceleration period Tu determined by the acceleration-period setting signal Tur which starts after the change of the current-conduction discrimination signal Cd to the high level (current conduction), outputting the second feeding-rate setting signal Fr2 which accelerates with an inclination to a value of the average feeding-rate setting signal Far from the second slow-down feeding rate. 3) Thereafter, outputting the second feeding-rate setting signal Fr2 having a value of the average feeding-rate setting signal Far.

Using the second feeding-rate setting signal Fr2 as input, the second feeding control circuit FC2 outputs, to the push-side feeding motor WM2, the second feeding control signal Fc2 for feeding the welding wire 1 at the feeding rate corresponding to a value of the second feeding-rate setting signal Fr2.

Figure 5:
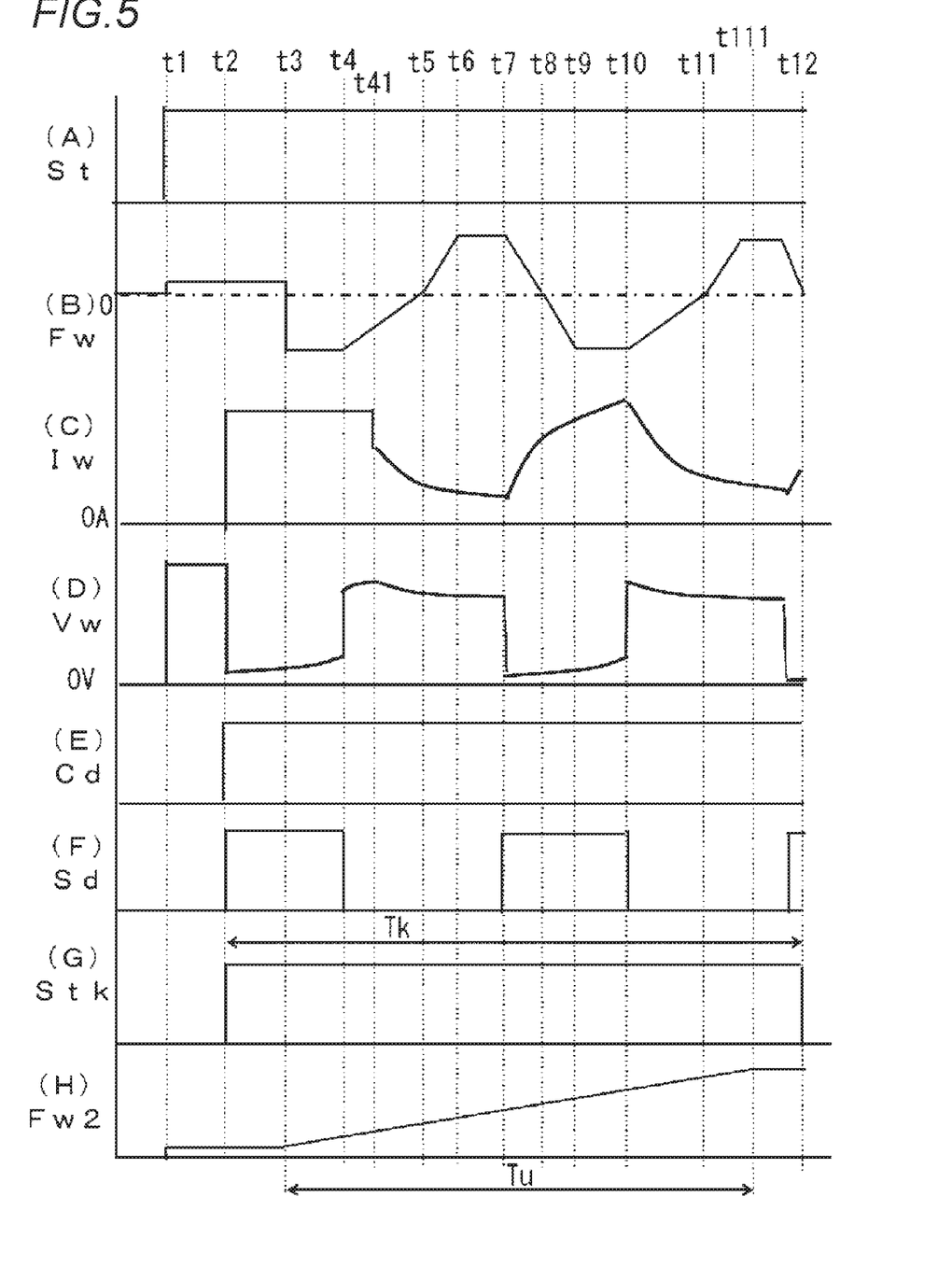
FIG. 5 A timing chart illustrating individual signals at a time of starting welding in the welding power supply of FIG. 4, showing the arc welding control method according to the second embodiment of the present invention.

FIG. 5 is a timing chart illustrating individual signals at a time of starting the welding in the welding power supply of FIG. 4, showing the arc welding control method according to the second embodiment of the present invention. (A) of this figure shows temporal change of the welding start signal St, (B) of this figure shows temporal change of a pull-side feeding rate Fw, (C) of this figure shows temporal change of the welding current Iw, (D) of this figure shows temporal change of the welding voltage Vw, (E) of this figure shows temporal change of the current-conduction discrimination signal Cd, (F) of this figure shows temporal change of the short-circuit discrimination signal Sd, (G) of this figure shows temporal change of the transient welding-period timer signal Stk, and (H) of this figure shows temporal change of a push-side feeding rate Fw2. This figure corresponds to FIG. 2 and is added with the push-side feeding rate Fw2 shown in (H) of this figure to FIG. 2. Operations of the individual signals other than the push-side feeding rate Fw2 are the same as those of FIG. 2, with explanation thereof being omitted. Hereinafter an operation of the push-side feeding rate Fw2 at the time of starting the welding will be explained with reference to this figure.

When the welding start signal St changes to the high level (welding start) at a time t1, as shown in (H) of this figure, the push-side feeding rate Fw2 changes from 0 to the predetermined second slow-down feeding rate of a positive value, and thus the welding wire 1 is fed forwardly. The second slow-down feeding rate is set to the same value as the slow-down feeding rate of the feeding rate Fw shown in (B) of this figure.

At a time t3 elapsing the delay period from a time t2 at which the current-conduction discrimination signal Cd shown in (E) of this figure changed to the high level, as shown in (H) of this figure, the push-side feeding rate Fw2 accelerates with the inclination and reaches a value of the average feeding-rate setting signal Far at a time t111 between a time t11 and a time t12. That is, during the predetermined acceleration period Tu from the time t3 to the time t111, the push-side feeding rate Fw2 accelerates with the inclination. The acceleration period Tu is set by the acceleration-period setting signal Tur of FIG. 4. The acceleration period Tu is set to be almost the same as a transient welding period Tk from the time t2 to the time t12. The push-side feeding rate Fw2 from the time t111 is kept at a constant value of the predetermined average feeding-rate setting signal Far.

By detecting an average value of the pull-side feeding rate Fw, the push-side feeding rate Fw2 on and after the time t111 may be subjected to a feedback control so as to be equal to the average value.

According to the second embodiment, the push-side feeding motor for performing the forward feeding control is provided in addition to the pull-side feeding motor for performing the forward/reverse feeding control. The push-side feeding motor accelerates with the inclination during the predetermined acceleration period after the start of conduction of the welding current. Consequently in the case of using the push-pull feeding system as the feeding system, effects similar to that of the first embodiment can be attained.

Third Embodiment

According to the invention of a third embodiment, an operation during the transient welding period of FIG. 2 is the same as that of the first embodiment but an operation during the steady welding period of FIG. 3 is different from that of the first embodiment. That is, according to the invention of the first embodiment, during the steady welding period, the feeding rate has the waveform of the predetermined pattern. The feeding rate is altered between the forward feeding period and the reverse feeding period not in response to the arc generation and the occurrence of short circuit as triggers. In contrast, according to the invention of the third embodiment, also during the steady welding period, the feeding rate is altered between the forward feeding period and the reverse feeding period in response to the arc generation and the occurrence of short circuit as triggers, like the operation during the transient welding period.

Figure 6:
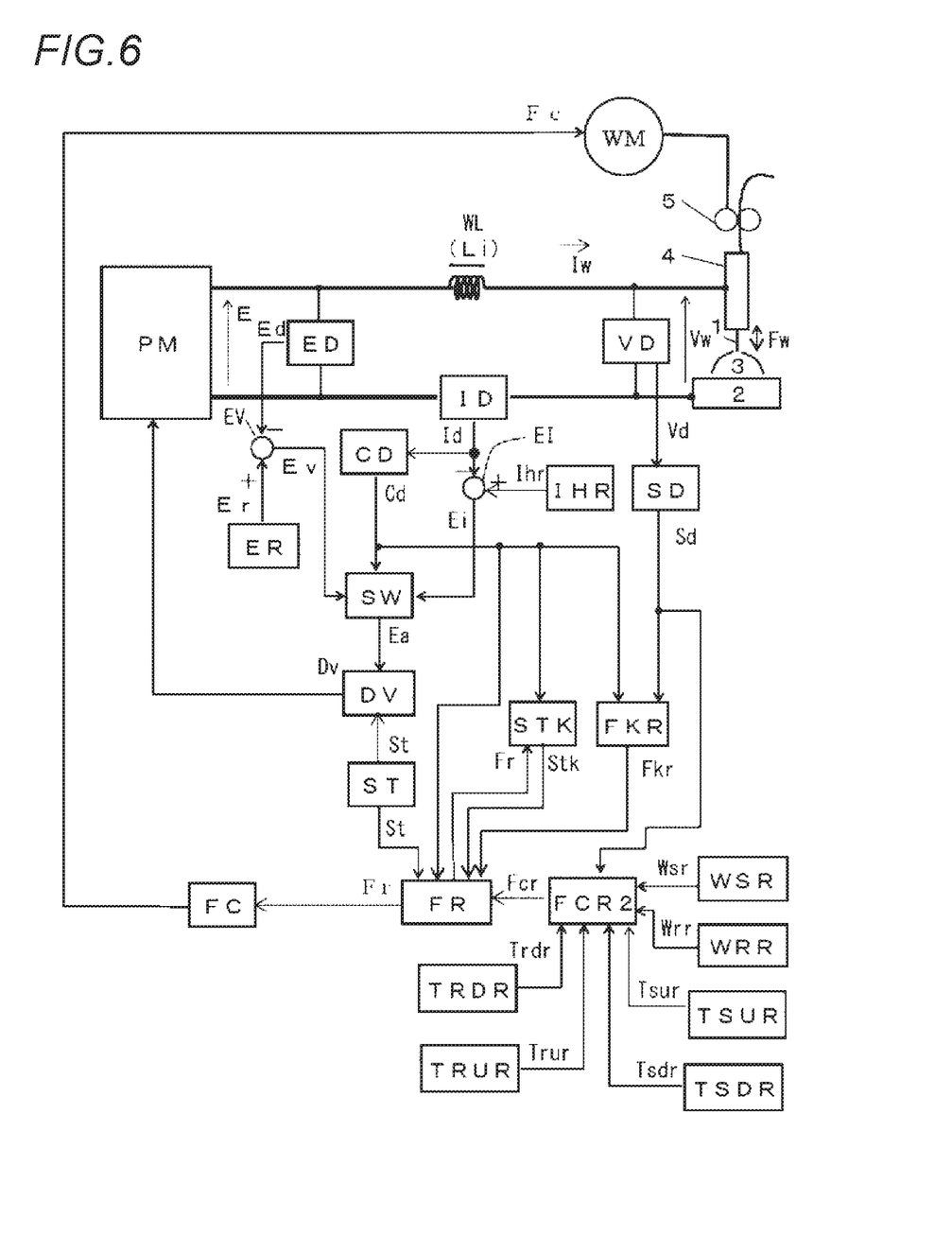
FIG. 6 A block diagram illustrating a welding power supply for implementing an arc welding control method according to a third embodiment of the present invention.

FIG. 6 is a block diagram illustrating a welding power supply for implementing an arc welding control method according to the third embodiment of the present invention. This figure corresponds to FIG. 1, and blocks identical to those of FIG. 1 are referred to by the same symbols, with explanation thereof being omitted. In this figure, the average feeding-rate setting circuit FAR, the cycle setting circuit TFR and the amplitude setting circuit WFR of FIG. 1 are omitted. However a forward-feeding acceleration-period setting circuit TSUR, a forward-feeding deceleration-period setting circuit TSDR, a reverse-feeding acceleration-period setting circuit TRUR, a reverse-feeding deceleration-period setting circuit TRDR, a forward-feeding amplitude setting circuit WSR and a reverse-feeding amplitude setting circuit WRR are added. Further the steady welding-period feeding-rate setting circuit FCR of FIG. 1 is replaced by a second steady welding-period feeding-rate setting circuit FCR2. Hereinafter these individual blocks will be explained with reference to this figure.

The forward-feeding acceleration-period setting circuit TSUR outputs a predetermined forward-feeding acceleration-period setting signal Tsur. The forward-feeding deceleration-period setting circuit TSDR outputs a predetermined forward-feeding deceleration-period setting signal Tsdr.

The reverse-feeding acceleration-period setting circuit TRUR outputs a predetermined reverse-feeding acceleration-period setting signal Trur. The reverse-feeding deceleration-period setting circuit TRDR outputs a predetermined reverse-feeding deceleration-period setting signal Trdr.

The forward-feeding amplitude setting circuit WSR outputs a predetermined forward-feeding amplitude setting signal Wsr for setting a forward-feeding peak value. The reverse-feeding amplitude setting circuit WRR outputs a predetermined reverse-feeding amplitude setting signal Wrr for setting a reverse-feeding peak value.

Using the forward-feeding acceleration-period setting signal Tsur, the forward-feeding deceleration-period setting signal Tsdr, the reverse-feeding acceleration-period setting signal Trur, the reverse-feeding deceleration-period setting signal Trdr, the forward-feeding amplitude setting signal Wsr, the reverse-feeding amplitude setting signal Wrr and the short-circuit discrimination signal Sd as input, the second steady welding-period feeding-rate setting circuit FCR2 generates a feeding rate pattern according to the following processing and outputs as a steady welding-period feeding-rate setting signal Fcr. A period where the feeding-rate setting signal Fr is 0 or more is the forward feeding period, whilst a period where this signal is smaller than 0 is the reverse feeding period. 1) During a reverse-feeding acceleration period Tru determined by the reverse-feeding acceleration-period setting signal Trur, outputting the steady welding-period feeding-rate setting signal Fcr which accelerates linearly from 0 to a reverse-feeding peak value Wrp of a negative value determined by the reverse-feeding amplitude setting signal Wrr. 2) Succeedingly, during a reverse-feeding peak period Trp, outputting the steady welding-period feeding-rate setting signal Fcr which maintains the reverse-feeding peak value Wrp. 3) When the short-circuit discrimination signal Sd changes to the low level (arc period) from the high level (short-circuiting period), shifting to a reverse-feeding deceleration period Trd determined by the reverse-feeding deceleration-period setting signal Trdr, and outputting the steady welding-period feeding-rate setting signal Fcr which decelerates linearly to 0 from the reverse-feeding peak value Wrp. 4) Succeedingly, during a forward-feeding acceleration period Tsu determined by the forward-feeding acceleration-period setting signal Tsur, outputting the steady welding-period feeding-rate setting signal Fcr which accelerates linearly from 0 to a forward-feeding peak value Wsp of a positive value determined by the forward-feeding amplitude setting signal Wsr. 5) Succeedingly, during a forward-feeding peak period Tsp, outputting the steady welding-period feeding-rate setting signal Fcr which maintains the forward-feeding peak value Wsp. 6) When the short-circuit discrimination signal Sd changes to the high level (short-circuiting period) from the low level (arc period), shifting to a forward-feeding deceleration period Tsd determined by the forward-feeding deceleration-period setting signal Tsdr, and outputting the steady welding-period feeding-rate setting signal Fcr which decelerates linearly to 0 from the forward-feeding peak value Wsp. 7) By repeating these processing 1) to 6), the steady welding-period feeding-rate setting signal Fcr of a feeding pattern changing in a form of a positive and a negative trapezoidal wave is generated.

A timing chart of individual signals at the time of starting the welding (during the transient welding) in the welding power supply of FIG. 6, illustrating the arc welding control method according to the third embodiment of the present invention, is the same as that of FIG. 2, and hence the explanation thereof is omitted.

Figure 7:
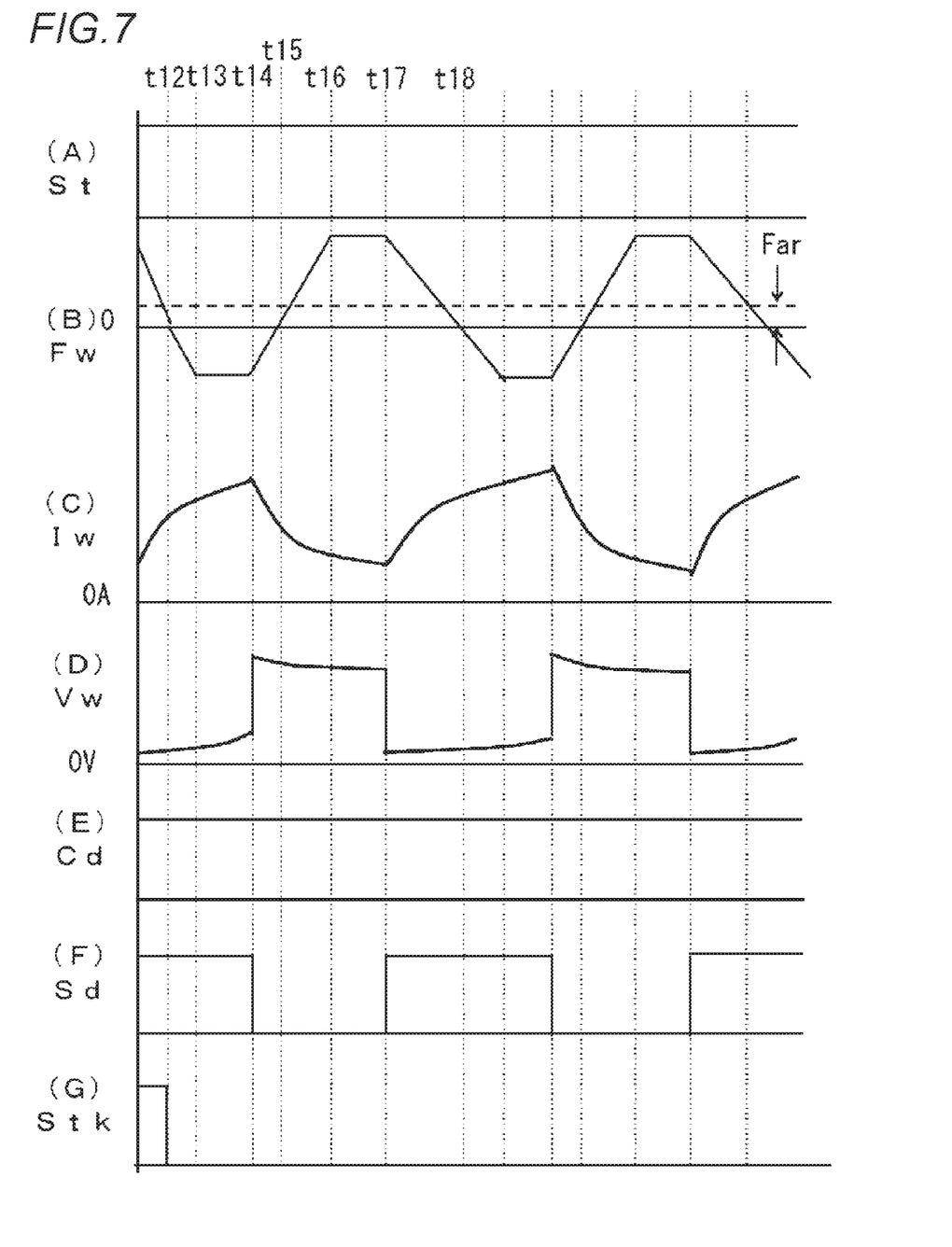
FIG. 7 A timing chart illustrating individual signals during the steady welding period in the welding power supply of FIG. 6, showing the arc welding control method according to the third embodiment of the present invention.

FIG. 7 is a timing chart illustrating individual signals during the steady welding period in the welding power supply of FIG. 6, illustrating the arc welding control method according to the third embodiment of the present invention. This figure shows an operation during the steady welding period on and after the time t12 at which the transient welding period Tk of FIG. 2 terminates. (A) of this figure shows temporal change of the welding start signal St, (B) of this figure shows temporal change of the feeding rate Fw, (C) of this figure shows temporal change of the welding current Iw, (D) of this figure shows temporal change of the welding voltage Vw, (E) of this figure shows temporal change of the current-conduction discrimination signal Cd, (F) of this figure shows temporal change of the short-circuit discrimination signal Sd, and (G) of this figure shows temporal change of the transient welding-period timer signal Stk. Hereinafter the operation during the steady welding period will be explained with reference to this figure.

The feeding rate Fw shown in (B) of this figure is controlled to a value of the feeding-rate setting signal Fr (steady welding-period feeding-rate setting signal Fcr) outputted from the feeding-rate setting circuit FR of FIG. 6. The feeding rate Fw is formed by the steady welding-period reverse-feeding acceleration period Tru determined by the reverse-feeding acceleration-period setting signal Trur of FIG. 6, the steady welding-period reverse-feeding peak period Trp continuing until generation of an arc, the steady welding-period reverse-feeding deceleration period Trd determined by the reverse-feeding deceleration-period setting signal Trdr of FIG. 6, the steady welding-period forward-feeding acceleration period Tsu determined by the forward-feeding acceleration-period setting signal Tsur of FIG. 6, the steady welding-period forward-feeding peak period Tsp continuing until occurrence of short circuit, and the steady welding-period forward-feeding deceleration period Tsd determined by the forward-feeding deceleration-period setting signal Tsdr of FIG. 6. Further the steady welding-period reverse-feeding peak value Wrp is determined by the reverse-feeding amplitude setting signal Wrr of FIG. 6, and the steady welding-period forward-feeding peak value Wsp is determined by the forward-feeding amplitude setting signal Wsr of FIG. 6. As a result, the feeding rate Fw has the feeding pattern changing in the form of the positive and negative trapezoidal waves.

As shown in (G) of this figure, when the transient welding-period timer signal Stk changes to the low level at the time t12, the feeding rate shifts to the steady welding period. During the steady welding period, the welding start signal St is maintained to the high level (welding start) as shown in (A) of this figure, whilst the current-conduction discrimination signal Cd is also maintained to the high level (current conduction) as shown in (E) of this figure.

[Operation During Steady Welding-Period Reverse-Feeding Period from Time t12 to Time t15]

As shown in (B) of this figure, the feeding rate Fw enters into the predetermined steady welding-period reverse-feeding acceleration period. Tru from the time t12 to a time t13 and accelerates from 0 to the predetermined steady welding-period reverse-feeding peak value Wrp. The short-circuiting period continues during this period.

When the steady welding-period reverse-feeding acceleration period Tru terminates at the time t13, as shown in (B) of this figure, the feeding rate Fw enters into the steady welding-period reverse-feeding peak period Trp and reaches the steady welding-period reverse-feeding peak value Wrp. The short-circuiting period also continues during this period.

When an arc is generated at a time t14, as shown in (F) of this figure, the short-circuit discrimination signal Sd changes to the low level (arc period). In response to this change, the feeding rate shifts to the predetermined steady welding-period reverse-feeding deceleration period Trd from the time t14 to a time t15. Thus as shown in (B) of this figure, the feeding rate Fw decelerates to 0 from the steady welding-period reverse-feeding peak value Wrp. Simultaneously, the welding voltage Vw rapidly increases to the arc voltage value of several tens of volts as shown in (D) of this figure, whilst the welding current Iw gradually reduces during the arc period as shown in (C) of this figure.

[Operation During Steady Welding-Period Forward-Feeding Period from Time t15 to Time t18]

When the steady welding-period reverse-feeding deceleration period Trd terminates at the time t15, the feeding rate shifts to the predetermined steady welding-period forward-feeding acceleration period Tsu from the time t15 to a time t16. During the steady welding-period forward-feeding acceleration period Tsu, the feeding rate Fw accelerates from 0 to the steady welding-period forward-feeding peak value Wsp as shown in (B) of this figure. The arc period continues during this period.

When the steady welding-period forward-feeding acceleration period Tsu terminates at the time t16, as shown in (B) of this figure, the feeding rate Fw enters into the steady welding-period forward-feeding peak period Tsp and reaches the steady welding-period forward-feeding peak value Wsp. The arc period also continues during this period.

When short circuit occurs at a time t17, as shown in (F) of this figure, the short-circuit discrimination signal Sd changes to the high level (short-circuiting period). In response to this change, the feeding rate shifts to the predetermined steady welding-period forward-feeding deceleration period Tsd from the time t17 to a time t18. Thus as shown in (B) of this figure, the feeding rate Fw decelerates to 0 from the steady welding-period forward-feeding peak value Wsp. Simultaneously, the welding voltage Vw rapidly reduces to the short-circuit voltage value of a few volts as shown in (D) of this figure, whilst the welding current Iw increases gradually during the short-circuiting period as shown in (C) of this figure.

During the steady welding period after the forward-feeding deceleration period, the operations of the steady welding-period reverse-feeding period and the steady welding-period forward-feeding period are alternatively repeated.

Although this embodiment is based on the first embodiment, this embodiment can be configured similarly in a case of being based on the second embodiment.

According to the invention of the third embodiment, also during the steady welding period, the feeding rate is changed to the steady welding-period forward-feeding period from the steady welding-period reverse-feeding period in response to the arc generation as a trigger, whilst the feeding rate is changed to the steady welding-period reverse-feeding period from the steady welding-period forward-feeding period in response to the occurrence of short circuit as a trigger, like the operation during the transient welding period. Consequently according to the invention of the third embodiment, the welding state during the transient welding period can be stabilized like the first embodiment. Concerning the steady welding period, the welding state is stable under the control of each of the first embodiment and the third embodiment.

INDUSTRIAL APPLICABILITY

According to the present invention, in the welding of alternating the feeding rate between the forward feeding period and the reverse feeding period, the forward/reverse feeding control, which is different from the control during the steady welding period, is performed during the transient welding period from the start of welding to the convergence to the steady welding period. Thus the welding state during the transient welding period can be stabilized.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-181993) filed on Sep. 8, 2014 and Japanese Patent Application (Japanese Patent Application No. 2014-197876) filed on Sep. 29, 2014, the contents of which are incorporated herein by reference.

DESCRIPTION OF REFERENCE NUMERALS 1 welding wire
2 base material
3 arc
4 welding torch
5 feeding roll
CD current-conduction discrimination circuit
Cd current-conduction discrimination signal
DV driving circuit
Dv drive signal
E output voltage
Ea voltage error amplified signal
ED output voltage detection circuit
Ed output voltage detection signal
EI current error amplifier circuit
Ei current error amplified signal
ER output voltage setting circuit
Er output voltage setting signal
EV voltage error amplifier circuit
Ev voltage error amplified signal
Fa average feeding rate
FAR average feeding-rate setting circuit
Far average feeding-rate setting signal
FC feeding control circuit
Fc feeding control signal
FC2 second feeding control circuit Fc2 second feeding control signal
FCR steady welding-period feeding-rate setting circuit
Fcr steady welding-period feeding-rate setting signal
FCR2 second steady welding-period feeding-rate setting circuit
FKR transient welding-period feeding-rate setting circuit
Fkr transient welding-period feeding-rate setting signal
FR feeding-rate setting circuit
Fr feeding-rate setting signal
FR2 second feeding-rate setting circuit
Fr2 second feeding-rate setting signal
Fw feeding rate/pull-side feeding rate
Fw2 push-side feeding rate
ID current detection circuit
Id current detection signal
IHR hot-start current setting circuit
Ihr hot-start current setting signal
Iw welding current
PM power supply main circuit
SD short-circuit discrimination circuit
Sd short-circuit discrimination signal
ST welding start circuit
St welding start signal
STK transient welding-period timer circuit
Stk transient welding-period timer signal
SW power-supply characteristic switching circuit
TF cycle
TFR cycle setting circuit
Tfr cycle setting signal
Tk transient welding period
Trd steady welding-period reverse-feeding deceleration period
TRDR reverse-feeding deceleration-period setting circuit
Trdr reverse-feeding deceleration-period setting signal
Trp steady welding-period reverse-feeding peak period
Tru steady welding-period reverse-feeding acceleration period
TRUR reverse-feeding acceleration-period setting circuit
Trur reverse-feeding acceleration-period setting signal
Tsd steady welding-period forward-feeding deceleration period
TSDR forward-feeding deceleration-period setting circuit
Tsdr forward-feeding deceleration-period setting signal
Tsp steady welding-period forward-feeding peak period
Tsu steady welding-period forward-feeding acceleration period
TSUR forward-feeding acceleration-period setting circuit
Tsur forward-feeding acceleration-period setting signal
Tu acceleration period
TUR acceleration-period setting circuit
Tur acceleration-period setting signal
VD voltage detection circuit
Vd voltage detection signal
Vw welding voltage
Wf amplitude
WFR amplitude setting circuit
Wfr amplitude setting signal
WL reactor
WM feeding motor
WM2 push-side feeding rate
Wrp steady welding-period reverse-feeding peak value
WRR reverse-feeding amplitude setting circuit
Wrr reverse-feeding amplitude setting signal
Wsp steady welding-period forward-feeding peak value
WSR forward-feeding amplitude setting circuit
Wsr forward-feeding amplitude setting signal

The invention claimed is:

1. An arc welding control method of performing a forward/reverse feeding control of alternating a feeding rate of a welding wire between a forward feeding period and a reverse feeding period, and generating short-circuiting periods and arc periods to perform welding, the arc welding control method comprising:
feeding the welding wire forwardly at a time of starting the welding; and
starting the forward/reverse feeding control from the reverse feeding period of the welding wire at a time when 1 to 10 ms have elapsed from a start of conduction of a welding current.

2. An arc welding control method of performing a forward/reverse feeding control of alternating a feeding rate of a welding wire between a forward feeding period and a reverse feeding period, and generating short-circuiting periods and arc periods to perform welding, the arc welding control method comprising:
feeding the welding wire forwardly at a time of starting the welding, and starting the forward/reverse feeding control from the reverse feeding period of the welding wire after starting conduction of a welding current;
during a transient welding period until convergence to a steady welding period, setting a waveform parameter of the feeding rate to a value different from that during the steady welding period; and
starting the steady welding period from the reverse feeding period.

3. The arc welding control method according to claim 2, wherein a push-side feeding motor for performing a forward feeding control is provided in addition to a pull-side feeding motor for performing the forward/reverse feeding control, and the push-side feeding motor accelerates with an inclination during the transient welding period after starting conduction of the welding current.

* * * * *